Sept. 8, 1953       H. A. SNOW       2,651,762
GAUGE HEAD
Original Filed June 20, 1944                4 Sheets-Sheet 1

INVENTOR
Harold A. Snow
BY Blair & Black
ATTORNEY

Sept. 8, 1953  H. A. SNOW  2,651,762
GAUGE HEAD

Original Filed June 20, 1944  4 Sheets-Sheet 4

INVENTOR
*Harold A. Snow*
BY *Blair & Black*
ATTORNEYS

Patented Sept. 8, 1953

2,651,762

UNITED STATES PATENT OFFICE 2,651,762

GAUGE HEAD

Harold A. Snow, West Orange, N. J., assignor to Federal Products Corporation, Providence, R. I., a corporation of Rhode Island Original application June 20, 1944, Serial No. 541,201. Divided and this application January 27, 1949, Serial No. 73,120

11 Claims. (Cl. 336—30)

This invention relates to a method of and apparatus for determining the value of a condition, or the value of a variation from a standard condition, more particularly to a method of and apparatus for measuring distance as, for example, measuring the dimensions of an article, or comparing the dimensions thereof with a standard.

This application is a division of my copending application Serial No. 541,201, filed June 20, 1944, U. S. Patent No. 2,503,851, for "Method of and Apparatus for Gauging."

Many articles of manufacture and many industrial processes involve the precise measurement or determination of the value of a condition such as size, distance, strain, pressure, hardness, etc. Hardness, for example, may be determined by measuring the penetration of a point into a material for a small distance under suitable applied pressure; strain due to applied stress or pressure may be determined by measuring a small change in length or position caused by application of the stress or pressure to a body. These and other values requiring the measurement of distances of a few thousandths of an inch or less with high accuracy must often be determined in controlling the characteristics of many manufactured products, or the operation of various industrial processes.

Where, for example, size or dimensions must be determined with high precision to within a few ten thousandths of an inch or less, conventional methods and devices have inherent limitations which restrict their field of use or their efficiency and accuracy. For example, mechanical methods of magnification with gears, levers and couples are restricted in maximum accuracy by the limitations of accurate construction, by reason of the necessary tolerances in the mechanical parts. Optical methods, such as those characterized by optical levers, are quite limited in magnification, while interference methods do not provide a simple and direct indication of size capable of being operated by inexperienced personnel. Although electrical methods are in general less restricted than others, because of the wide range of magnification available, and the variety of available existing principles which may be used to translate a distance into an electrical value, the electrical methods heretofore used for accurate measurement are, for the most part, restricted in their application in practical equipment, owing to inherent limitations of the methods.

Industrial measurement requirements vary according to the character of the workpiece being produced. For example, in the manufacture of gauge blocks it is necessary to determine the size of the block with an accuracy of the order of a few millionths of an inch or less. Even high precision production workpieces often necessitate sizing with an accuracy of a few hundred thousandths of an inch in order to fulfill tolerance requirements. Where the measurement requirements do not necessitate sizing to such small fractions of an inch there are often other problems such as classification of pieces which vary in size over a range of a few thousandths of an inch.

A gauge capable of meeting the requirements of such industrial measurements should have certain characteristics. First the gauge should be capable of evaluating size of a wide variety of materials and shapes in different ranges of fractions of a unit of measurement, for example, in hundredths, thousandths, and ten thousandths of an inch, and should be readily adjustable to any required accuracy of measurement. Secondly, such a gauge should be characterized by high speed of response, so as to make possible, for example, the inspection of a maximum number of workpieces per unit of time, particularly where high production manufacturing methods are being used. Thirdly, such a gauge should be capable of automatically indicating size limits over a given tolerance range so that an unskilled operator can easily determine in the event the workpiece is over or under the precise size, whether or not it is within the assigned tolerance. A gauge having this characteristic should also be well adapted to use in connection with automatic inspection, sorting and recording devices, where it is desirable so to employ the gauge. Fourthly, the gauge must be characterized by a high degree of sensitivity in order to be able to detect size variations of the order of a few millionths of an inch or less, and indicate the same to the operator. Fifthly, unless such a gauge is highly stable, its indications are unreliable. Accordingly, the gauge should be characterized by such simplicity of structure as not to require unduly high precision in the machining of its component parts, and so as not to be affected by normal temperature variations such as are customarily encountered in a normal area of use. There are, of course, additional factors that should characterize such a gauge, such as ability to withstand hard usage, accuracy of response over extended periods of use, and low maintenance requirements.

The objects of this invention include the attainment of these and other characteristics.

According to my invention with respect to its broader aspects, I am able to determine the value of a condition or the value of a variation thereof by creating another condition whose value is a function of the value of the first condition or the variation thereof, and then generating a quantity, the value of which may be measured and indicated, which is linearly proportional to the value of the created condition.

More specifically, an electrical method of measuring minute values is provided which utilizes variations in the effective strength of a magnetic field in the region of an inductance coil which is energized by an electrical current having alternating components. The alternating components of this magnetic field induce an alternating voltage in a second coil, the amplitude of the induced voltage depending on the effective strength of the magnetic field at the location of the second coil. A change in relative position of the second coil and magnetic field causes the amplitude of the induced voltage to change by reason of the change in effective strength of the magnetic field at different relative positions. This change in amplitude of the induced voltage may then be used as a measure of the relative position of the coils, provided the law of magnetic field strength or induced voltage change with respect to the relative movement is accurately known. By suitably arranging the coils and relative movement thereof, a linear relation between coil position and induced voltage amplitude is attained so that simple and accurate calibration may be obtained for a wide range of distances.

Inasmuch as my method is based on fundamental electrical principles of magnetic field strength near an energized coil, it is accordingly not restricted to any particular frequency of operation, and the system may, as noted above, be non-ferrous. Thus high frequency alternating or periodically varying voltage sources, as well as low frequency sources, may be used to energize the coils. I prefer, however, to use frequencies of a relatively high order in order to obtain extremely rapid electrical response, for example, within one thousandth of a second or less, with the use of frequencies in or above the ordinary audio range. Furthermore by employing frequencies of this order, I am able to use small coils, thus increasing the stability and reducing the inertia of a movable coil as well as the size and weight of distance measuring apparatus.

The invention will be further described by referring to the accompanying drawings in which.

Figure 1:
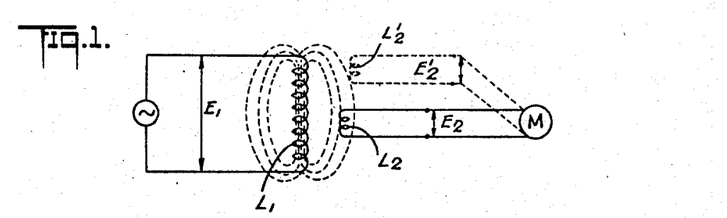
Figure 1 shows the movement of a coil in the magnetic field generated by the passage of an alternating current through another coil.

As shown in Figure 1, an alternating voltage $E_1$ may be applied to a coil $L_1$ with the result that a voltage $E_2$ is induced in a second coil $L_2$ located in the electromagnetic field of the first coil. The amplitude of the induced voltage may be indicated by a suitable meter M connected to the terminals of the second coil. The induced voltage $E_2$ has the same general characteristics as the applied voltage $E_1$, except that it may be either in phase with or opposed (substantially 180° out of phase) to the applied voltage. It is apparent, of course, that the amplitude of the induced voltage may vary over a wide range, depending on the amplitude of the applied voltage and the relative positions of the two coils.

When the applied voltage is maintained at a constant amplitude, the induced voltage is constant in amplitude for a fixed relative position of the coils, as represented, for example, by the coils $L_1$, $L_2$ of Figure 1. If the second coil $L_2$ is then moved to a new position, as represented by the dotted coil $L'_2$, the amplitude of the induced voltage changes to a new value $E'_2$ for almost any direction of motion of the coil. This change in amplitude of the induced voltage may be used as a measure of the distance through which the coil has been moved by a suitable calibration of the change in voltage in terms of coil position.

It is desirable to have a linear relation between coil position and induced voltage in order to provide accurate and stable calibrations over a wide range of distance measurement, as will be more fully described below.

Figures 2, 3, 3A, 4, 4A:
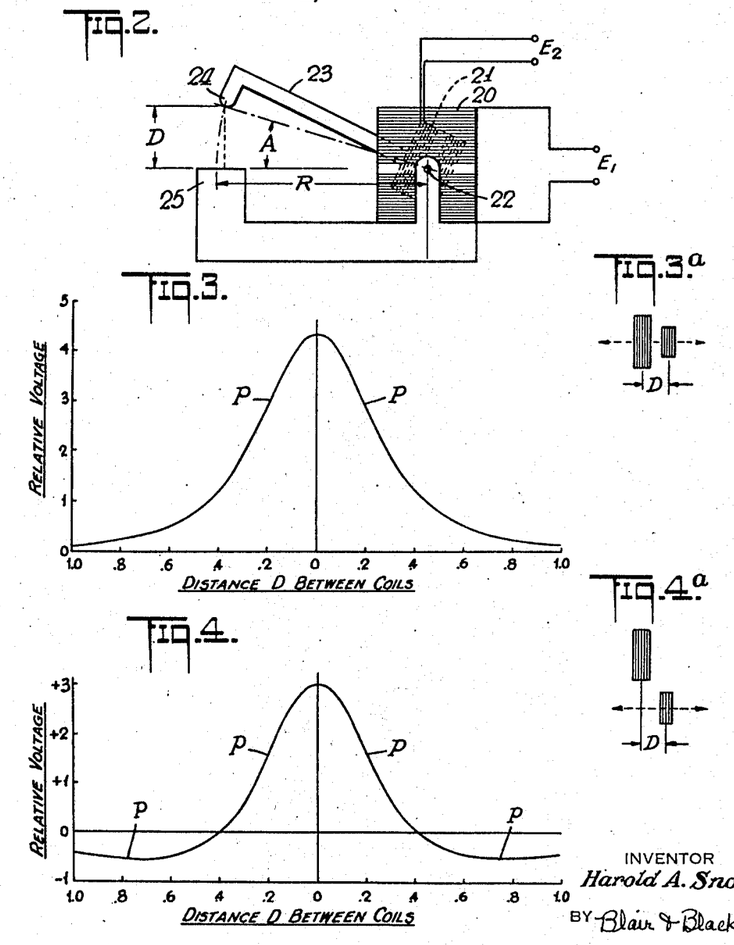
Figure 2 shows one means of obtaining a linear relation between coil position and induced voltage amplitude.
Figures 3 and 3a show diagrammatically the relation between induced voltage and distance displacement for one type of space relation between coils, and path of relative movement of the coils.
Figures 4 and 4a show the relation between induced voltage amplitude and distance displacement having another arrangement of coils and path of relative movement thereof.

One manner of obtaining a linear relation between coil position and induced voltage amplitude is shown in Figure 2, in which a fixed coil 20 is energized by the application of an alternating voltage $E_1$ to its terminals. A second coil 21 is arranged so that it may be rotated about an axis 22 by a lever 23 in a region in which the magnetic field of the energized coil 20 is approximately uniform. When the tip 24 of lever 23 rests on the top surface of a support 25, the axes of the two coils are arranged to be perpendicular so that the voltage $E_2$ induced in movable coil 21 is substantially zero. When the tip 24 of lever 23 is raised by an amount represented by the vertical distance D, coil 21 turns through an angle A and the induced voltage $E_2$ increases in amplitude by an amount proportional to the sine of the angle of rotation A. This may be expressed by $E_2 = K$ sine $A$, where K is a suitable constant. It is apparent that the sine of angle A is equal to distance D divided by the radius R of lever 23, so that the above equation may be written $$E_2 = \frac{KD}{R}$$

With constant values of K and R, which may be obtained with a voltage of constant amplitude applied to the fixed coil, the induced voltage is proportional to the vertical distance through which lever tip 24 is moved, and thus varies in a substantially linear relation with the vertical dimension of an article placed between the top of support 25 and lever tip 24.

While the structure shown in Figure 2 has a number of advantages and is structurally simple, it should be understood that it is merely illustrative of the principles involved in my method of operation.

In other physical embodiments of my apparatus, there are advantages in the use of a linear relative motion of coils to convert distance displacement into electrical values, and I have found that certain coil arrangements provide a useful and highly accurate method of distance measurement, as will appear in the following.

Figures 5, 5A, 6, 7:
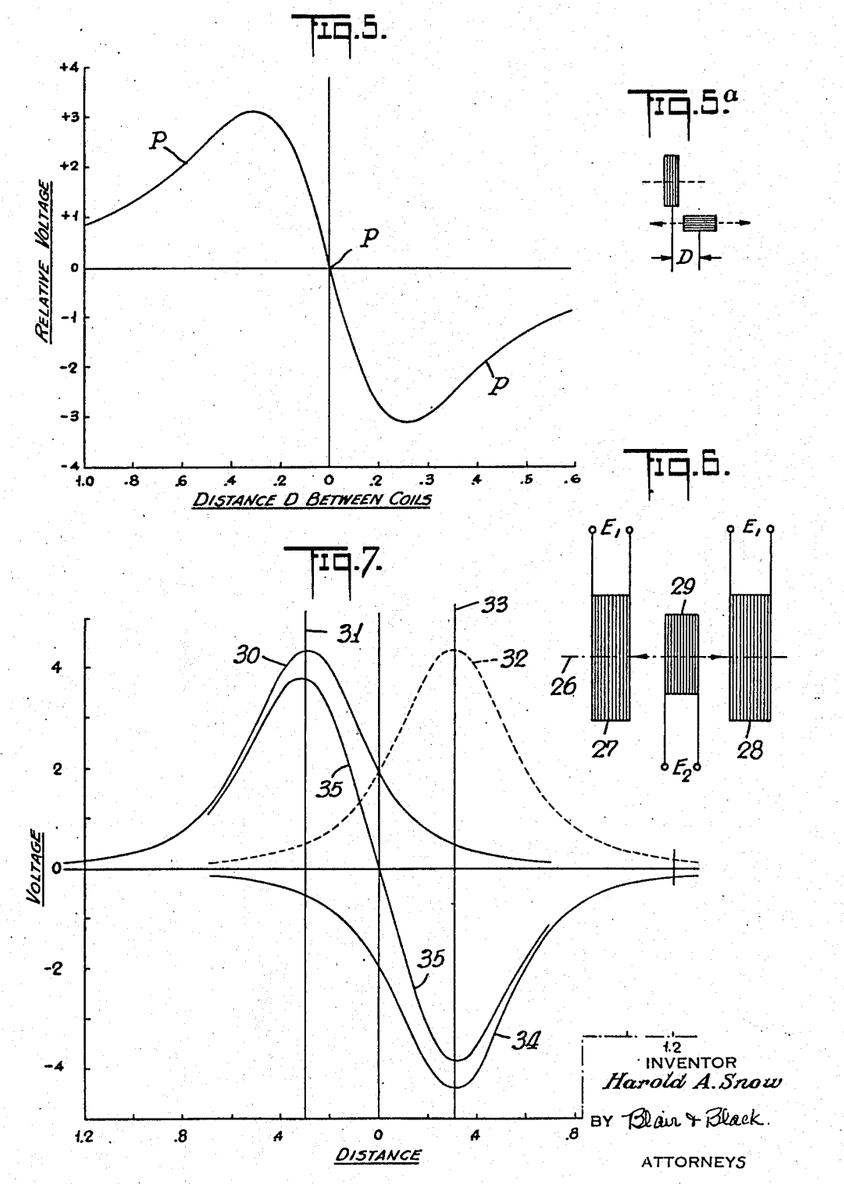
Figures 5 and 5a show the relation between voltage amplitude and distance displacement between another coil arrangement and path of relative movement thereof.
Figures 6 and 7 show the relation between voltage amplitude and distance displacement with another and preferred type of coil arrangement and path of relative movement of said coils.

The several curves shown in Figures 3, 4 and 5 are illustrative of the relation between voltage and distance displacement where linear coil motion is used. These curves show the relative amplitude of voltage induced in a coil when it is moved along a straight line in the electromagnetic field of a fixed coil energized with an alternating current of constant amplitude. The horizontal dimensions of these curves represent the location of the movable coil with respect to the fixed coil, measuring from a central position nearest the center of the fixed coil. Vertical dimensions represent the relative amplitude of the voltage induced in the movable coil. The small diagram 3a, 4a, 5a accompanying each curve indicates the relative coil positions, the dotted arrow showing the direction of motion of the movable coil.

Referring to Figure 3, I have shown the relation between distance displacement and induced voltage when the two coils are arranged with concentric or common axes, and the line of motion is along the common axis, one coil being smaller than the other so that it may be moved through the center of the larger.

Figure 4 illustrates the voltage distance relation of two coils having parallel axes, one coil being at the side of the other. In this case, the voltage reaches zero at two points equidistant from the central coil position, and reverses in phase at greater distances from the center. The reversal in phase is indicated by the negative region of the voltage dimension i. e. voltages represented as negative or below the zero reference are opposite in phase to those represented as positive.

Figure 5 shows the voltage distance relation of two coils having perpendicular intersecting axes. The line of motion in this case is parallel to the axis of one coil, and it may be noted that the voltage is zero at zero distance, i. e. when the axis of one coil intersects the center of the other coil. The voltage reverses in phase at this point, and is equal in amplitude but opposite in phase symmetrically about this point of zero voltage.

It will now appear that the curves shown in Figures 3, 4 and 5 have an important characteristic in common, namely they are complex curves having regions of reversed curvature between which exist points of inflection. The approximate location of these points of inflection are indicated by the designation P. At each point of inflection, the curvature becomes zero, i. e. the curve is a straight line or is linear at the point of inflection, and substantially linear for a greater or lesser distance on each side of this point. At this point, the rate of change in voltage per unit distance is substantially constant, and it is only in the region of a point of inflection that a substantially linear relation exists between voltage and distance. Hence, by arranging the coils to operate at or in the region of a point of inflection of their voltage distance characteristic and by including in the circuits thereof a proper balancing voltage where needed, a substantially linear conversion of distance to an electrical value may be obtained.

From a consideration of Figures 3, 4 and 5, it will now appear that the distance over which the distance voltage relation is linear depends on several factors, including size, shape and primary location of the coils, and may be increased or decreased by suitable coil design. It will also be noted from a consideration of Figure 5, that the coil design and location corresponding to the central point of inflection provide a greater range of linearity than the coil arrangements shown in Figures 3 and 4, and furthermore provide a zero induced voltage at the point of inflection.

A variation in space relation may be measured with the coil arrangements illustrated in Figures 3, 4 and 5 by arranging the coils to be relatively movable in accordance with the variation along a suitable path and locating the coils relatively at or near a point of inflection. An energizing voltage having alternating components is applied to one coil, with the result that an alternating voltage is induced in the second coil. A balancing voltage having characteristics the same as those of the induced voltage, but opposite in phase, is obtained by conventional means from the energizing voltage. The balancing voltage is combined with the induced voltage with the result that the combined voltages, or output voltage, is then substantially zero owing to the phase opposition of the two combined voltages.

Variation in relative coil position from their initial position, in accordance with the variation to be measured, then causes the output voltage to increase in amplitude from substantially zero in a linear relation with the variation. A suitable indicator of the voltage amplitude, calibrated in terms of distance, then indicates the variation. Furthermore, the phase of the output voltage reverses with a reversal of the direction of relative motion of the coils from their initial position, so that the phase of the output voltage may be used to indicate the direction of relative movement of the coils.

The balancing voltage may be adjustable over a wide range and it then provides a means for adjusting the output voltage to substantially zero or to other desired values, for any relative coil position or for any particular value of induced voltage. It thus provides a means for operating at or near any desired inflection point and provides other characteristics, as will be shown hereinafter.

In a preferred embodiment of my invention, and to the end of attaining an extended range of linearity, together with other important characteristics of utility in accurate distance measurements, I have provided the coil arrangement shown in Figure 6. In this arrangement three coils are located on a common axis 26, two of the coils, 27 and 28, being identical and fixed in position, while the other coil 29 is disposed between coils 27 and 28 and is movable along axis 26. When an alternating voltage $E_1$ is applied to one fixed coil, e. g. coil 27, and movable coil 29 is moved along axis 26, the voltage induced in the movable coil varies in amplitude with change in distance in a manner similar to that illustrated by the curve in Figure 3. This variation in voltage with distance may be represented by the curve 30 in Figure 7, the location of the center of fixed coil 27 in this case being represented by the vertical line 31 on the distance coordinate.

Referring back to Figure 6, if the same voltage $E_1$ is disconnected from coil 27, and is then applied to the other fixed coil 28, the variation in induced voltage with distance displacement may be represented by the dotted curve 32 in Figure 7, the location of the center of this fixed coil 28 being represented by the vertical line 33. It will now appear that the connections of the fixed coil 28 may be reversed with a resulting reversal in the phase of the induced voltage in which case the induced voltage may be represented as a negative voltage by the curve 34.

If then the applied voltage is connected to both fixed coils in such a manner that their electromagnetic fields oppose one another, the field around one fixed coil, e. g. coil 27, induces the voltage illustrated by curve 30, while the field around the other coil 28 induces the voltage of opposite phase illustrated by curve 34, in movable coil 29. It follows that the resulting induced voltage is the algebraic sum of these two voltages, which is represented by the heavy curve 35. Thus, the actual induced voltage varies with the position of movable coil 29, as shown by curve 35, the induced voltage being accurately proportional to the distance through which the movable coil is moved from its central position for a comparatively large distance of movement. In other words, a very substantial range of linearity is provided. This range may be increased by selecting, for given coils, a space between the fixed coils in which the curvature of the voltage distance relationship of each fixed coil compensates or cancels out over a large distance resulting in a linear voltage distance relation of very substantial range.

In addition to attaining a substantial range of linearity with the coil arrangement shown in Figure 6, this arrangement has another advantage of substantial importance in dimensional measurement of high accuracy, in that such arrangement is sensitive to displacement of the moving coil in one direction only, namely along the common axis of the three coils. Other displacements of the movable coil, such as lateral motion relative to the common axis, or a tilting motion which might well normally result from manufacturing limitations, are compensated and produce a negligible change in induced voltage amplitude, even when measuring with an accuracy of a millionth of an inch or less. Lateral motion of the moving coil relative to the common axis, even over an appreciable distance, results in negligible voltage amplitude change, because of the fact that as one side of the moving coil approaches nearer to one side of the fixed coil, thus tending to increase the voltage induced, the opposite side of the moving coil moves farther from the fixed coil by the same amount, thus reducing the induced voltage. Thus the net change in induced voltage is substantially zero. Similarly, if the movable coil is tilted, as may well occur when it is mounted with free fitting bearings, one side of the movable coil moves parallel to its axis, while the opposite side of the movable coil moves parallel to the axis but in the opposite direction by substantially the same amount. Thus, the increased voltage induced in one side of the coil is cancelled by the reduction of voltage induced in the other side, again resulting in no net amplitude change. It follows then that the movable coil may be mounted in various ways so as to operate with a free motion, without introducing errors in measurement.

My coil system utilizes air-core coils and might be characterized as non-ferrous, thus attaining the desirable characteristics of high stability, simplicity and being essentially independent of frequency. Furthermore, no appreciable forces due to magnetic action or attraction exist in the movable portion of such a system so that the relative coil position may be freely changed without being influenced by the strength of the magnetic field.

The change in amplitude of the induced voltage resulting from relative movement of the coils is substantially instantaneous, that is, the amplitude changes with the coil position with no appreciable or measurable delay. This system thus may be considered to instantaneously modulate the amplitude of an alternating voltage in accordance with the position of a coil, regardless of the speed with which the coil position changes.

While the modulation is instantaneous, a finite time interval is ordinarily required by practical indicators to give an indication or a measure of the amplitude. This interval depends upon the frequency of the induced voltage, decreasing as the frequency increases, so that the maximum speed of response of the measuring system is generally limited by the action of an indicator to a value which depends on the frequency of the induced voltage.

As pointed out above, high speed of response or measurement is of primary importance in many industrial inspections where small distances such as the measurement of momentary strain and surface smoothness are involved, and in industrial gauging. For example, the diameter of large quantities of workpieces, such as pistons and bearing rollers, are usually gauged individually with high accuracy to insure proper fitting, such pieces being frequently sorted into several size groups within given tolerance limits having a variation of diameters of from one to a few ten-thousandths of an inch per group.

Figure 8:
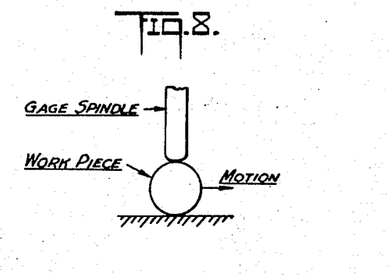
Figure 8 shows diagrammatically engagement of a gauge spindle and workpiece.

In such gauging, it is frequently desirable for reasons of accuracy of measurement and simplicity of motion, to pass workpieces through a gauge with a uniform motion, as illustrated in Figure 8, so that the workpiece moves continuously along an anvil or track while the maximum displacement of a gauge spindle or measuring member, bearing on the workpiece, corresponds to the correct diameter. While it is desirable for obvious reasons to maintain as high a rate of gauging as practicable, particularly in automatic gauging, it is found that the speed is usually limited to the speed of response of the gauge.

Figure 9:
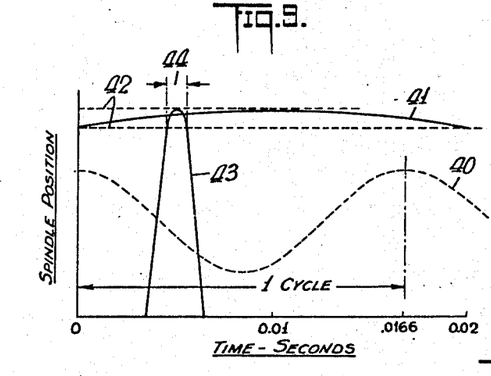
Figures 9 and 10 illustrate diagrammatically the relation between rate of distance displacement, e. g. rate of spindle movement of a gauge and frequency of the electrical current or voltage change in the coils.

For example, as a workpiece passes through a gauge, the motion of the spindle or measuring member of the gauge may be illustrated by Figure 9, in which vertical ordinates represent the position of the spindle, greatly magnified, while horizontal ordinates represent time in seconds. A 60-cycle wave 40 is superimposed on this figure for timing purposes. When a workpiece, as illustrated in Figure 8, moves at a speed of, for example, one inch per second, the position of the spindle in the region of its maximum height may be represented by the curve 41 of Figure 9. For purposes of utility, the piece being measured should ordinarily remain under the spindle, so that the spindle remains within the limits 42 representing a reasonable accuracy of measurement, for a period of the order of one cycle of the energizing frequency, so that the amplitude of one cycle of the output voltage may give a reasonably accurate indication of the diameter of the piece. Usually the speed must be slower than illustrated to allow time for several cycles of the output voltage to operate a suitable indicator.

When the speed of the workpiece is increased to a quite moderate speed of, for example, 20 inches per second, the motion of the spindle may be represented by curve 43. It may be noted that in this case the interval 44 during which the spindle is in the correct position to indicate diameter with reasonable accuracy is far too small a fraction of a cycle of the energizing frequency to produce any amplitude change in the output voltage capable of indicating size. The duration of the measuring interval 44 may be of the order of 0.001 second or less with ordinary speeds of travel of the workpiece, and ordinary electrical gauging methods utilizing power frequencies fail far below such speeds.

Figure 10:
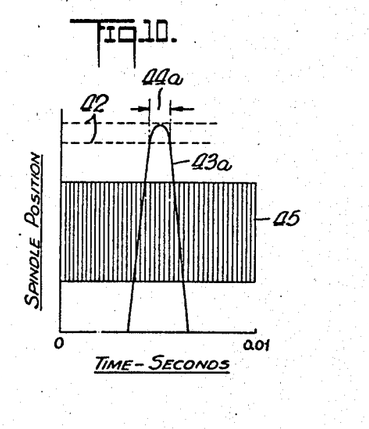

My invention provides a method of measuring small distances having no electrical limitation in speed of practical importance in any ordinary gauging. A single moving element of the utmost simplicity is employed for converting distance to electrical value. Thus the moving element of a gauge may be very light in weight so that it responds with high speed and accuracy to dimension changes. This method also eliminates the inherent restrictions of magnetizable cores so that any desired frequency up to and including radio frequencies may be employed for energization. This speed of action is illustrated in Figure 10, in which curve 43a represents the same spindle motion, drawn to the same scale as that of curve 43 of Figure 9. A suitable energizing frequency is represented in Figure 10 by the close vertical lines 45.

For a measuring interval 44a of 0.001 second, and an energizing frequency of 100,000 cycles per second, 100 complete cycles occur during the measuring interval while with an energizing frequency of 1,000,000 cycles per second, 1000 cycles occur during the measuring interval, many more than are required to operate an indicator of size. Thus for a wide range of practical operating frequencies the speed of accurate measurement, i. e. the speed of response, is far greater than the speed of the spindle motion illustrated in Figures 9 and 10, and the electrical response is sufficiently rapid that it can follow the position of a gauging spindle within less than one thousandth of a second, so that a visible or other indication of size which may be held for as long a time as desired can be obtained. The electrical speed is high compared to the mechanical speed of the spindle motion so that the speed of the gauge is limited only by that of accurate motion of the spindle.

Owing to the simplicity and light weight of the moving element of the gauge, the maximum speed of accurate spindle motion may be made quite high; it being quite practical to gauge accurately in less than 0.001 second or with workpieces moving at speeds greater than several feet per second, speeds many times that of ordinary gauges. In continuous gauging of, for example, sheet or wire, the high speed of this method permits the detection of flaws or thickness variations of only a small fraction of an inch in length at a speed of travel of many feet per second.

While many forms of equipment may be made utilizing the above method of distance measurement, an example of one application to industrial measurement is a gauge of the external comparator type, suitable for general measurement or comparison of dimensions over a wide range of accuracy of, for example, a few millionths of an inch or less to several thousandths of an inch or more.

Such a gauge compares a dimension of a workpiece with that of a standard and provides two types of size indication by means of different indicators. One type, useful when exact sizes are required, is a meter indication which shows the difference in dimension between a workpiece and a standard, directly in suitable fractions of an inch. The second type, useful in rapid production inspection, is an automatic limit indicator, far more rapid than a meter, which may be preset, for example, to two dimension limits, then by means of three indicators such as colored lights, the size of a piece may be classified as either within the dimension limits, oversize or undersize. More than two limits may also be employed for purposes of sorting or classification into a number of size groups. Either type of indicator may be employed for indicating dimension differences of any value from a few millionths to several thousandths of an inch or more.

As noted hereinabove, I prefer to use the coil system shown in Figure 6 for certain types of gauging, and have embodied this preferred arrangement in a gauge head generally indicated at 50 in Figure 11. Head 50 is carried by a bracket 51 which is vertically adjustable along a rack 52 through manipulation of a knob and gear generally indicated at 53 by which the gauge head can be set and locked in any desired position above a base 54 which supports an anvil 55 adapted to receive the workpiece. Head 50 includes a base plate 56 on which a casing 57 is mounted, this casing housing substantially all of the operating elements of the gauge head.

Disposed within the housing and secured thereto in any suitable manner is a support 58, to the top of which is fastened a coil supporting bracket 59 as by screws 60, this bracket being formed of non-ferrous, non-magnetic material such as, for example, brass. The free end 59a of bracket 59 extends beyond support 58 where it supports a stationary coil form 61 which is fastened in the outer end of the bracket in any suitable manner. Coil form 61 is fabricated from any suitable insulating material having stable characteristics suitable for a gauge of the type under consideration, and has wound thereon a pair of suitably spaced coils 62 and 63, these coils being electrically connected so that their magnetic fields oppose one another.

Reciprocably mounted within coils 62 and 63 in a manner to be described is a spindle 64 on which a sleeve 65 of non-magnetic material, such as copper, is fastened. Sleeve 65 in turn has secured thereto a coil form 66 also formed of a suitable insulating material, and on which is wound a coil 67, the opposite ends of which are attached to leads 68 and 69 (see Figure 12). Each of these leads as, for example, lead 69 (Figure 11) is carried in a groove 70 cut in the coil form 66, and extends slightly upwardly therefrom. The other lead 68 is similarly mounted in a slot formed in the opposite side of coil form 66, the two leads being secured in their bottom ends to the coil form in any suitable manner and firmly held in place thereon by a suitable number of turns of lacing cord 74. The upper ends of leads 68 and 69 are attached to the ends respectively of resilient connectors 75 and 76, the other ends of which are fastened to suitable terminals 77 and 78 mounted on opposite sides of the gauge head casing 57.

Terminals 77 and 78 also have connected thereto the wires 79 and 80 of a cable 81, which carries the output of movable coil 67 (Figure 11) as will be described in greater detail hereinbelow.

Collar 72 provides a support for the lower end of a spring 82, the upper end of which bears against the bottom of a pressure adjusting plate 83 fastened to the top of casing 57. An adjusting screw 84 is threaded through the top of the casing and against the top of pressure adjusting plate 83 so that the vertical position of the plate can be varied as desired, thereby to set the pressure of spring 82 to any desired value. This spring 82 is provided to impart a downward bias to spindle 64 to assure the close contact of its bottom surface with a workpiece when the workpiece is set therebeneath on anvil 55. The upper end of spindle 64 accordingly extends upwardly through spring 82 through a hole 83a in pressure adjusting plate 83 and through a suitable hole in the top of casing 57 which acts as a bearing for the upper end of the spindle. Preferably I provide a dust cap 85 to cover and accordingly protect the top of spindle 64.

The bottom of gauge casing 57 has a hole 86 formed therein which receives the upper end 87a of a bushing support 87 having formed thereon a flange 88 by which the bushing support is secured to the bottom of casing 57 in any suitable manner as, for example, by screws (not shown). The lower end of bushing support 87 carries a bushing 89 which is held within the support by means of a set screw 90. Thus, bushing 89 forms a lower bearing for spindle 64, and accordingly coacts with the hole in the top of casing 57 to restrict the motion of the spindle substantially to a vertical path, sufficient play, however, being provided at the spindle bearings to permit substantially frictionless movement of the spindle. The lower end 64a of spindle 64 has fastened thereto a coupling 91, the lower end of which receives a hardened end 92, the bottom of which engages the top of a workpiece placed on anvil 55 beneath the spindle.

Spindle 64 also has mounted thereon a collar 93 provided with a vertical slot 94. A guide screw 95 threadably extends through the upper end 87a of bushing support 87 to a position where its inner reduced end 95a enters slot 94 thus restricting angular movement of the spindle to preclude damage to the connections of leads 68 and 69 with connectors 75 and 76 respectively.

It may now be seen that when the workpiece is placed in the gauge beneath the gauge head, spindle 64 is moved upwardly, thus imparting movement to coil 67 relative to stationary coils 62 and 63, which results in a voltage being induced in the movable coil. The coils are so arranged that the movable coil moves along a path in the magnetic field of the stationary coils in which the field strength is a linear function of movement along the path. Hence the voltage induced in the movable coil is linearly proportional to the amount of displacement or movement of the movable coil as described hereinbefore in connection with the coil shown in Figure 6.

As noted in connection with Figures 6 and 7, a distance may be measured by moving the small coil 29 along its axis for a given distance, and measuring the change in amplitude of the voltage developed in the movable coil by means of a suitable meter, making proper allowance for any reversal in phase. Over any distance within the limits of linearity of curve 35 (Figure 7), the change in voltage amplitude is accurately proportional to the change in space relation, and thus is an accurate measure of the distance through which the coil moves.

When measuring quite small distances or measuring with high accuracy, it is preferable to operate with the movable coil 29 in a region near its central position relative to the fixed coils 26 and 27.

In this coil arrangement, voltage is induced in the movable coil by means of opposing magnetic fields, the strength of one increasing and the other decreasing, as coil 29 is moved to various positions along the coil axes. It may be considered that two opposing voltages are induced in the movable coil, which at the central position substantially cancel or balance out resulting in substantially zero voltage when the two voltages are equal in amplitude and opposite in phase. The degree of balance depends on the exactness of phase opposition or phase balance, as well as equality in amplitudes of the induced voltages.

Figure 13:
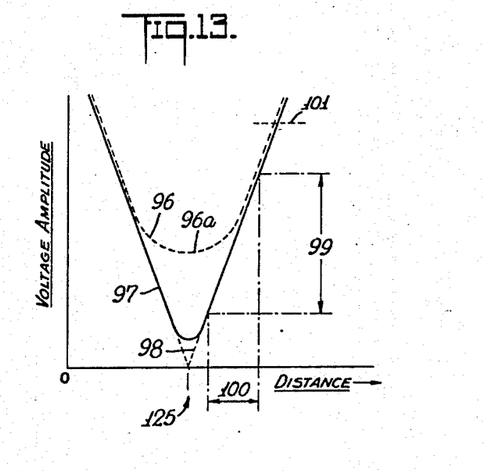
Figure 13 illustrates diagrammatically the effect of phase balance in the region of zero output voltage correlating with amplification of the output voltage and measurement thereof.

This is illustrated in Figure 13 which represents the amplitude of the voltage developed in the movable coil, disregarding phase, as the coil is moved in the region of its central position. As illustrated by curve 96, the amplitude reaches a minimum value at the central position 125, for a given phase balance, while for a better phase balance it reaches a lower value as illustrated by curve 97. The values approach a perfect balance indicated by the broken lines 98 as the phase balance increases in exactness.

In measuring very small variations in space relation of for example a few millionths of an inch, it is desirable to employ vacuum tube amplifiers to magnify the small voltage changes corresponding to such variations. The output of such amplifiers is limited and overload occurs above certain values so it is desirable to operate within definite limits of voltage applied to the input of an amplifier.

For example, in Figure 13, a range of voltage may be represented by the interval 99, which is suitable for measuring variations in space relation along a range 100, when using an amplifier having an upper limit represented by the voltage amplitude 101. It is apparent that the phase balance illustrated by the curve 97 provides satisfactory operation while that corresponding to the curve 96 fails to operate owing to the high minimum voltage amplitude. In other words, the phase balance illustrated by curve 97 provides region 99 wherein the response is linearly proportional to movement along the range 100, whereas the phase balance illustrated by curve 96 has no region comparable in extent to region 99, hence movement through the left-hand portion of range 100 would not evoke a linearly proportional response.

The maximum amplification that can be employed increases as the accuracy of the balance increases so that for measurements of extreme sensitivity it is advantageous that an accurate balance be provided to meet the requirements of a suitable amplifier.

Figure 11:
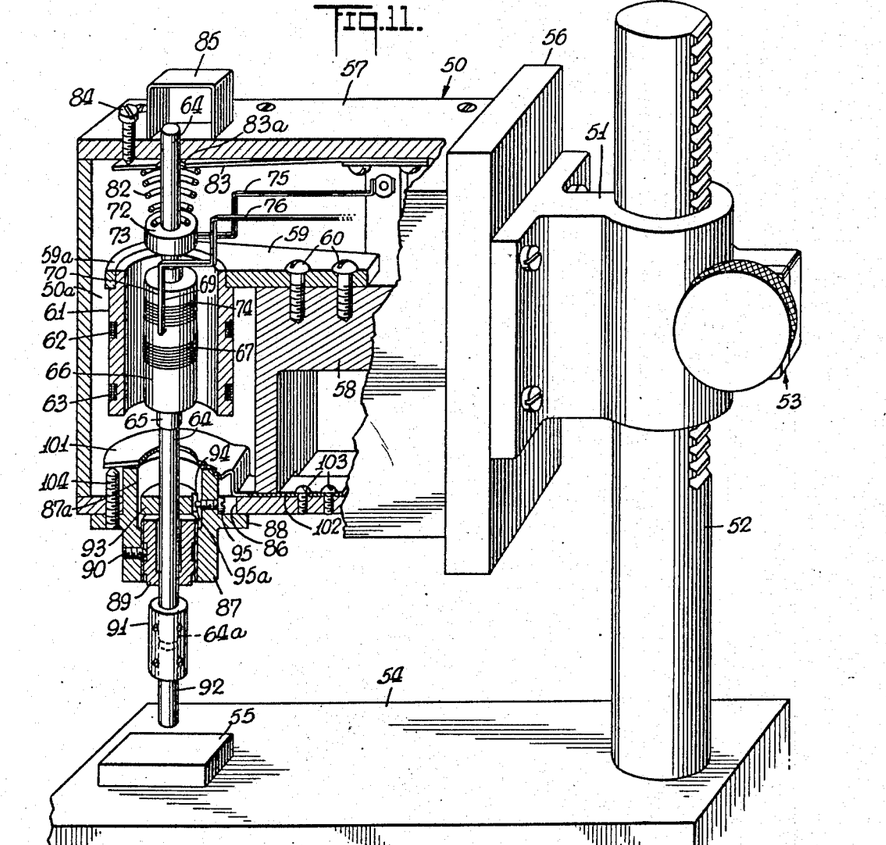
Figure 11 is a perspective elevational view of a gauge structure.
Figure 12:
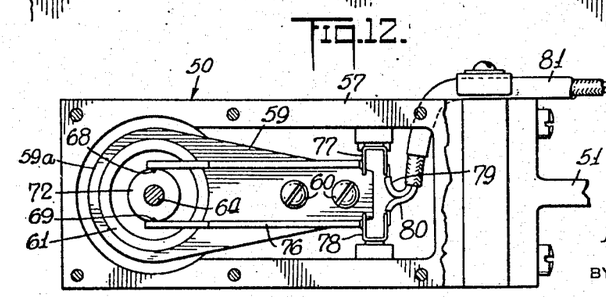
Figure 12 is a plan view of the apparatus shown in Figure 11.

When the coil system shown in Figure 11 is employed, a simple and stable phase adjustment is provided by bracket 59 and an adjustable non-magnetic metallic plate generally indicated at 101. Bracket 59 which supports the fixed coils 62 and 63 is located a suitable distance above upper fixed coil 62, plate 101 being located at approximately the same distance below the lower fixed coil 63.

Plate 101 is annular in shape to permit the passage therethrough of spindle 64 and is provided with an ear 102 fastened to the bottom of casing 57 by screws 103. Thus plate 101 is resiliently mounted within the casing below the coil system. Vertical adjustment of plate 101 is effected by an upwardly extending screw 104 threaded through the bottom of casing 57. Thus by manipulation of screw 104 the position of plate 101 may be adjusted relative to the coil system.

Owing to the circulating currents set up in plates 101 and bracket 59 by the magnetic fields of coils 63 and 62, the effective resistance of each fixed coil is slightly increased and thus the phase of each magnetic field is slightly changed by the proximity of each plate to the adjacent coil.

By raising or lowering the adjustable balance plate 101, the phase of the magnetic field of the lower fixed coil 63, and thus the phase of the corresponding voltage induced in the movable coil, may be adjusted over a sufficient range to accurately balance the phase of the induced voltages. A highly accurate balance may thus be obtained. This balance is highly stable since the entire balancing system is contained in a single structure which is simple, symmetrical and mechanically stable, and the balance is independent of external connections, circuits or apparatus.

In maintaining an accurate phase balance, it is desirable that movement of spindle 64 which carries the movable coil 67 have a negligible effect on the phase of the magnetic fields. To prevent variations in phase, the spindle is made of substantially uniform diameter along the portion within the magnetic fields of coils 62 and 63 so that its effect on the phase of the fields is uniform and constant regardless of its position. Also as movable coil 67 is mounted over the non-magnetic shield 65, variations in the magnetic characteristics of the spindle material have a negligible effect on the phase balance of such a gauge.

I claim:

1. In a gauge head of the character described, the combination of, a metallic casing, a feeler mounted to move with respect to said casing and engageable with a work piece exteriorly of said casing, a movable coil system mounted within said casing to be moved by movement of said feeler, a fixed coil system mounted within said casing coaxially with respect to said movable coil system, a fixed member of non-magnetic material which is a good electrical conductor having a portion coaxial with and in fixed relationship to said fixed coil system at one end thereof, a movable member similar in its electrical and magnetic characteristics to said fixed member and adjustably mounted at the other end of said fixed coil system, and a non-magnetic concentric shielding sleeve of material which is a good electrical conductor extending throughout the length of said coil systems.

2. In a gauge head of the character described, the combination of, a metallic casing, a feeler mounted to move with respect to said casing and engageable with a work piece exteriorly of said casing, a movable coil system mounted within said casing to be moved by movement of said feeler, a fixed coil system mounted within said casing and operatively associated with said movable coil system, a fixed member of non-magnetic material at one end of said fixed coil system, and a movable member similar in its electrical and magnetic characteristics to said fixed member and adjustably mounted at the other end of said fixed coil system.

3. In a gauge head of the character described, the combination of, a metallic casing, a feeler mounted to move with respect to said casing and engageable with a work piece exteriorly of said casing, spring means associated with said feeler and constantly biasing it in work-engaging direction, a movable coil system mounted within said casing to be moved by movement of said feeler, a fixed coil system mounted within said casing and operatively associated with said movable coil system, a fixed member of non-magnetic material having a portion coaxial with and in fixed relation to said fixed coil system at one end thereof, and a movable member similar in its electrical and magnetic characteristics to said fixed member and adjustably mounted at the other end of said fixed coil system.

4. In a gauge head of the character described, the combination of, a casing, a coil, means mounting said coil for rectilinear movement in said casing, first means in said casing to induce a voltage in said coil, second means in said casing to induce an opposing voltage in said coil, and means for balancing out said voltages when said coil is centrally positioned relative to said first and second voltage inducing means, said balancing means including two non-magnetic members, one of which is fixedly mounted in said casing and provides a support for both of said voltage inducing means, and the other of which is movably mounted in said casing at a distance from said fixed member.

5. In a gauge head of the character described, the combination of, a casing, a coil, means mounting said coil for rectilinear movement in said casing, first means in said casing to induce a voltage in said coil, second means in said casing to induce an opposing voltage in said coil, adjustable means for balancing out said voltages when said coil is centrally positioned relative to said first and second voltage inducing means, said adjustable means including a non-magnetic member movably positioned in said casing with respect to said voltage inducing means, and a member movably mounted in said casing for adjustably positioning said non-magnetic member.

6. In a gauge head of the character described, the combination of, a casing, a coil, means mounting said coil for rectilinear movement in said casing, first means in said casing to induce a voltage in said coil, second means in said casing to induce an opposing voltage in said coil, adjustable means for balancing out said voltages when said coil is centrally positioned relative to said first and second voltage inducing means, said adjustable means including a non-magnetic electrically conductive plate fastened at one end to said casing and free at its other end, and a screw rotatably mounted in said casing and pressing against the free end of said plate, whereby said plate may be moved relative to said voltage inducing means.

7. In a gauge head of the character described, the combination of, a casing, a spindle axially movable and adjustable with respect to said casing, a coil concentric with and movable with said spindle, a non-magnetic electrically conductive supporting bracket attached to said casing, a pair of fixed coils wound upon a coil form secured to said bracket and concentric with said spindle such that said coils are positioned on one side of said bracket, and a non-magnetic, electrically conductive member adjustably positioned on the opposite side of said coils from said bracket.

8. In a gauge head of the character set forth in claim 7, said adjustable member comprising a plate having an ear fastened to said casing and movable toward or away from said fixed coils by a screw rotatably mounted in said casing.

9. In a gauge head of the character set forth in claim 7, means for limiting radial or rotatable movement of said spindle.

10. In a gauge head of the character described, the combination of, a casing, a spindle extending through said casing and axially movable and adjustable with respect to said casing, a coil concentric with and movable with said spindle, a non-magnetic, electrically conductive supporting bracket attached to said casing, a coil form attached to said bracket and concentric with said spindle, a pair of fixed coils wound upon said coil form such that said coils are positioned on one side of said bracket, and a non-magnetic, electrically conductive member adjustably positioned on the opposite side of said coils from said bracket.

11. In a gauge head of the character described in claim 10, said adjustable member comprising a plate having an ear fastened to said casing such that said plate is pivotable about said ear, and a screw rotatably mounted in said casing and pressing against the pivotable end of said plate toward or away from said fixed coils.

HAROLD A. SNOW.

References Cited in the file of this patent

UNITED STATES PATENTS

| Number | Name | Date |
|---|---|---|
| 2,050,629 | Quereau | Aug. 11, 1936 |
| 2,136,219 | Scherbatskoy | Nov. 8, 1938 |
| 2,220,126 | Six | Nov. 5, 1940 |
| 2,240,184 | Hathaway | Apr. 29, 1941 |
| 2,305,626 | Lee | Dec. 22, 1942 |
| 2,408,524 | Mestas | Oct. 1, 1946 |
| 2,470,244 | Fryklund | May 17, 1949 |